(12) United States Patent
Lee et al.

(10) Patent No.: US 11,843,103 B2
(45) Date of Patent: Dec. 12, 2023

(54) RECHARGEABLE BATTERY PACK

(71) Applicant: Samsung SDI Co., Ltd., Yongin-si (KR)

(72) Inventors: Hyeok Lee, Yongin-si (KR); Gunyeob Park, Yongin-si (KR); Kilseok Lee, Yongin-si (KR); Beomjoo Kim, Yongin-si (KR); Jaeho Kim, Yongin-si (KR); Baeckgi Jung, Yongin-si (KR); Heonhee Kim, Yongin-si (KR); Jisoon Lim, Yongin-si (KR); Eungi Heo, Yongin-si (KR)

(73) Assignee: Samsung SDI Co., Ltd., Yongin-si (KR)

(*) Notice: Subject to any disclaimer, the term of this patent is extended or adjusted under 35 U.S.C. 154(b) by 46 days.

(21) Appl. No.: 17/172,814

(22) Filed: Feb. 10, 2021

(65) Prior Publication Data
US 2021/0265682 A1 Aug. 26, 2021

(30) Foreign Application Priority Data
Feb. 25, 2020 (KR) .......... 10-2020-0022958

(51) Int. Cl.
*H01M 10/6568* (2014.01)
*H01M 10/613* (2014.01)
*H01M 10/6556* (2014.01)

(52) U.S. Cl.
CPC ..... *H01M 10/6568* (2015.04); *H01M 10/613* (2015.04); *H01M 10/6556* (2015.04)

(58) Field of Classification Search
CPC ......... H01M 10/6568; H01M 10/6556; H01M 10/613
See application file for complete search history.

(56) References Cited

U.S. PATENT DOCUMENTS

| 8,999,549 B2 | 4/2015 | Kim et al. |
| 2016/0372805 A1* | 12/2016 | Kim ..................... H01M 10/613 |
| 2017/0110747 A1 | 4/2017 | Ha |
| 2020/0076026 A1* | 3/2020 | Ohkuma ........... H01M 10/6567 |

FOREIGN PATENT DOCUMENTS

| KR | 10-1293989 B1 | 8/2013 |
| KR | 10-1631458 B1 | 6/2016 |
| KR | 10-2017-0044477 A | 4/2017 |
| KR | 10-2017-0078381 A | 7/2017 |

* cited by examiner

*Primary Examiner* — James Lee
(74) *Attorney, Agent, or Firm* — Lewis Roca Rothgerber Christie LLP

(57) ABSTRACT

A rechargeable battery pack including: a plurality of unit battery packs stacked and coupled to each other in multiple stages, the unit battery packs having a cooling water line formed therein to circulate cooling water inside the unit battery pack; and a connection part connecting the cooling water line in adjacent ones of the unit battery packs to each other such that the cooling water line is configured to circulate cooling water therebetween.

11 Claims, 8 Drawing Sheets

RECHARGEABLE BATTERY PACK

CROSS-REFERENCE TO RELATED APPLICATION

This application claims priority to and the benefit of Korean Patent Application No. 10-2020-0022958, filed in the Korean Intellectual Property Office on Feb. 25, 2020, the content of which is incorporated herein by reference in its entirety.

BACKGROUND

1. Field

Aspects of embodiments of the present disclosure relate to a rechargeable battery pack.

2. Description of Related Art

A rechargeable battery is a battery that is designed to be repeatedly charged and discharged, unlike a primary battery. A small-capacity rechargeable battery may be used for a portable, small electronic device, such as a mobile phone, a laptop computer, and a camcorder, while a large-capacity rechargeable battery may be used as a power source for driving a motor of, for example, an electric bicycle, a scooter, an electric vehicle, or a fork lift.

The rechargeable battery may be one unit battery cell or may be a rechargeable battery pack including a plurality of unit battery cells that are connected to each other in parallel or in series to provide a large-capacity battery. For example, the rechargeable battery pack may have a structure that uses a tab for connecting a plurality of unit battery cells to each other in series or in parallel and to draw out current from the unit battery cells.

When a plurality of unit battery cells are included, the rechargeable battery pack may have a structure that can effectively dissipate heat generated while being charged and discharged to satisfy high power demands, and the structure effectively fix the unit battery cells to prevent or mitigate damage caused by impact and vibration.

To this end, a cooling line for cooling the rechargeable battery pack may be provided, and the cooling line may be exposed and installed at the outside of a battery housing.

However, when an external impact is applied to the cooling line when the cooling line protrudes outside of the battery housing, a fire may occur when the flow of cooling water is disturbed or leakage occurs due to breakage and pressure.

The above information disclosed in this Background section is for enhancement of understanding of the background of the disclosure, and therefore, it may contain information that does not form the prior art that is known to a person of ordinary skill in the art.

SUMMARY

An embodiment of the present disclosure provides a rechargeable battery pack that may form a cooling water line inside the battery pack through which cooling water is circulated to prevent the cooling water line from being damaged due to external impact.

According to an embodiment of the present disclosure, a rechargeable battery pack including: a plurality of unit battery packs stacked and coupled to each other in multiple stages, the unit battery packs having a cooling water line formed therein to circulate cooling water inside the unit battery pack; and a connection part connecting the cooling water line in adjacent ones of the unit battery packs to each other such that the cooling water line is configured to circulate cooling water therebetween.

The cooling water line may include: a first cooling line extending in a height direction inside the unit battery pack; and a second cooling line connected to the first cooling line and extending along an inner bottom surface of the unit battery pack.

The first cooling line and the second cooling line may be connected to each other by an inclined line inside the unit battery pack.

The connection part may include: a first connection part connected to the first cooling line at a lower portion of a first one of the unit battery packs; and a second connection part inserted into and connected to the first connection part at an upper portion of a second one of the unit battery packs.

The first connection part may include: a first flange part on a lower surface of the first one of the unit battery packs; and a first connection pipe coupled to the first flange part, one side of the first connecting pipe being inserted into the first cooling line in the first one of the unit battery packs and another side of the first connecting pipe protruding from the first flange part opposite to the one side of the first connection pipe.

A first groove may be in the lower surface of a first one of the unit battery packs at where the first flange part is fixed.

A plurality of first friction protrusions may protrude on an outer surface of the first connection pipe.

The second connection part may include: a second flange part on an upper surface of the second one of the unit battery packs; and a second connection pipe coupled to the second flange part, one side of the second connection pipe being inserted into and fixed to the first connection pipe and another side of the second connection pipe being inserted into the first cooling line in the second one of the unit battery packs.

A second groove may be in the upper surface of the second one of the unit battery packs where the second flange part is fixed.

A plurality of second friction protrusions may protrude on an outer surface of the second connection pipe.

The connection part may include: a first groove on an upper surface of a first one of the unit battery packs around where the first cooling line in the first one of the unit battery packs opens outside the first one of the unit battery packs; a second groove on a lower surface of a second one the unit battery packs around where the first cooling line in the second one of the unit battery packs opens outside the second one of the unit battery packs; and a binder in the first groove and the second groove to seal the first groove and the second groove to each other.

The first groove and the second groove may have the same shape.

The first groove and the second groove may have a round shape on a surface of the corresponding unit battery pack around the first cooling line.

According to the embodiment of the present disclosure, a cooling water line is formed through which cooling water is circulated inside a battery pack and which may not be damaged due to external impact, thereby improving durability.

According to the embodiment of the present disclosure, when the cooling water line includes the first cooling line in an up-down direction, the second cooling line formed under a battery pack, and an inclined line connecting the first cooling line and the second cooling line to each other, circulation efficiency of the cooling water may be improved.

According to the embodiment of the present disclosure, it is possible to connect cooling lines formed in each of unit battery packs stacked in multiple stages using a connection part, and thus, stable sealing is possible so that external leakage of cooling water does not occur.

DETAILED DESCRIPTION

Figure 1:
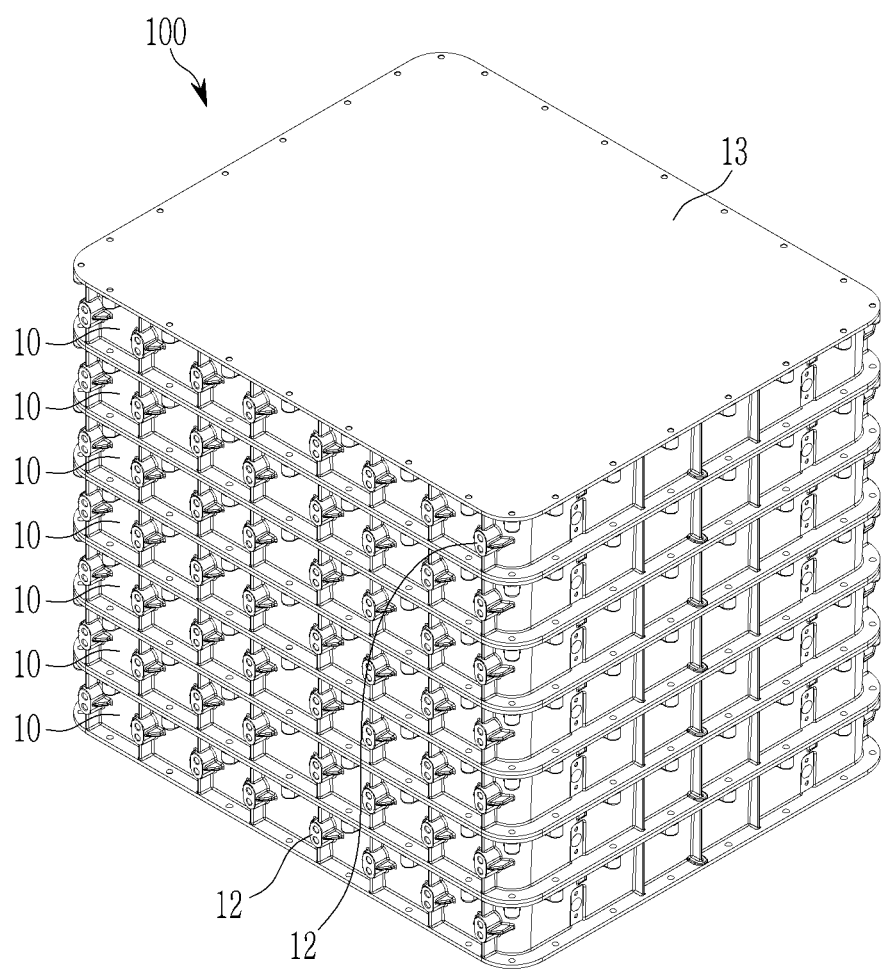
FIG. 1 is a schematic perspective view of a rechargeable battery pack according to a first embodiment of the present disclosure.

The present disclosure will be described more fully hereinafter with reference to the accompanying drawings, in which embodiments of the present disclosure are shown. As those skilled in the art would realize, the described embodiments may be modified in various different ways, all without departing from the spirit or scope of the present disclosure. The drawings and description are to be regarded as illustrative in nature and not restrictive. Like reference numerals designate like elements throughout the specification.

It will be understood that when an element or layer is referred to as being "on," "connected to," or "coupled to" another element or layer, it may be directly on, connected, or coupled to the other element or layer or one or more intervening elements or layers may also be present. When an element or layer is referred to as being "directly on," "directly connected to," or "directly coupled to" another element or layer, there are no intervening elements or layers present. For example, when a first element is described as being "coupled" or "connected" to a second element, the first element may be directly coupled or connected to the second element or the first element may be indirectly coupled or connected to the second element via one or more intervening elements.

In the figures, dimensions of the various elements, layers, etc. may be exaggerated for clarity of illustration. As used herein, the term "and/or" includes any and all combinations of one or more of the associated listed items. Further, the use of "may" when describing embodiments of the present disclosure relates to "one or more embodiments of the present disclosure." Expressions, such as "at least one of," when preceding a list of elements, modify the entire list of elements and do not modify the individual elements of the list. Also, the term "exemplary" is intended to refer to an example or illustration. As used herein, the terms "use," "using," and "used" may be considered synonymous with the terms "utilize," "utilizing," and "utilized," respectively.

As used herein, the terms "substantially," "about," and similar terms are used as terms of approximation and not as terms of degree, and are intended to account for the inherent variations in measured or calculated values that would be recognized by those of ordinary skill in the art.

It will be understood that, although the terms first, second, third, etc. may be used herein to describe various elements, components, regions, layers, and/or sections, these elements, components, regions, layers, and/or sections should not be limited by these terms. These terms are used to distinguish one element, component, region, layer, or section from another element, component, region, layer, or section. Thus, a first element, component, region, layer, or section discussed below could be termed a second element, component, region, layer, or section without departing from the teachings of example embodiments.

Spatially relative terms, such as "beneath," "below," "lower," "above," "upper," and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" or "over" the other elements or features. Thus, the term "below" may encompass both an orientation of above and below. The device may be otherwise oriented (rotated 90 degrees or at other orientations), and the spatially relative descriptors used herein should be interpreted accordingly.

The terminology used herein is for the purpose of describing particular example embodiments of the present disclosure and is not intended to be limiting of the described example embodiments of the present disclosure. As used herein, the singular forms "a" and "an" are intended to include the plural forms as well, unless the context clearly indicates otherwise. It will be further understood that the terms "includes," "including," "comprises," and/or "comprising," when used in this specification, specify the presence of stated features, integers, steps, operations, elements, and/or components but do not preclude the presence or addition of one or more other features, integers, steps, operations, elements, components, and/or groups thereof.

Figure 2:
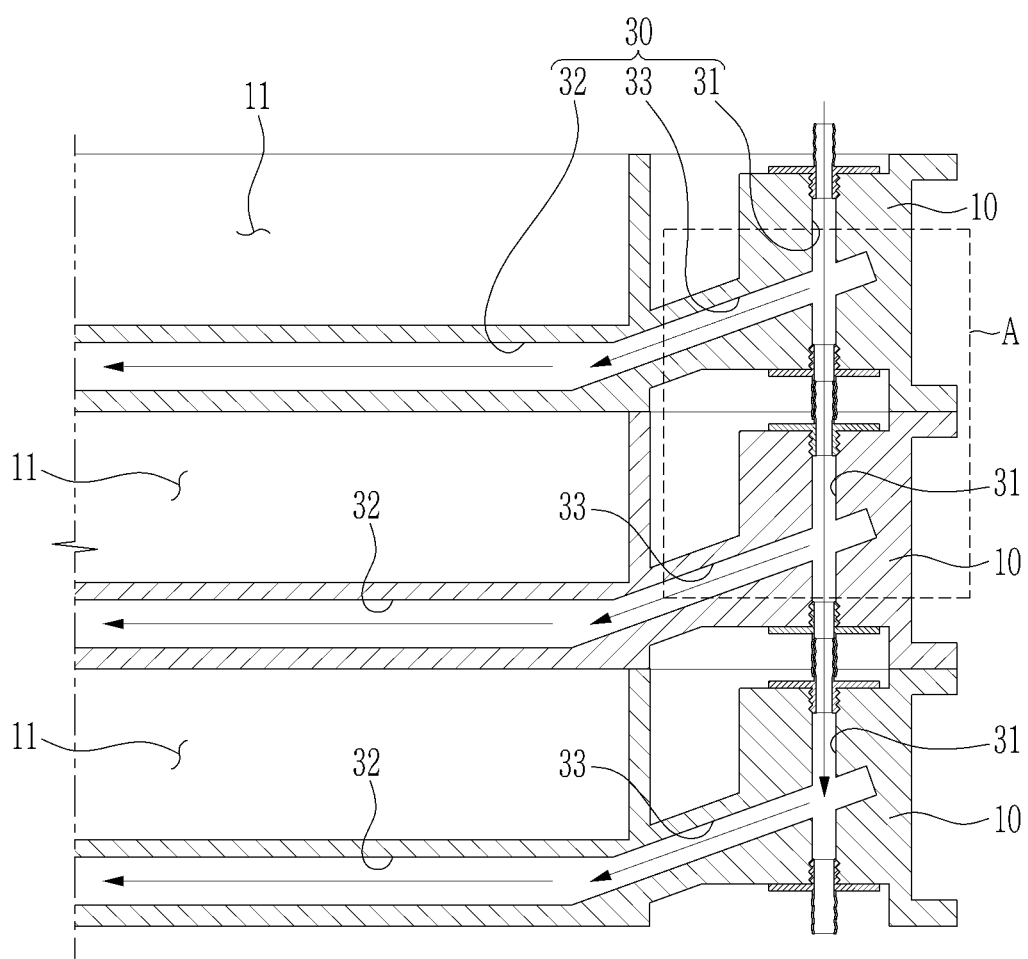
FIG. 2 is a cross-sectional view showing some parts of the rechargeable battery pack shown in FIG. 1.

FIG. 1 is a schematic perspective view of a rechargeable battery pack according to a first embodiment of the present disclosure, and FIG. 2 is a cross-sectional view of some parts of the rechargeable battery pack shown in FIG. 1 in a state in which a cooling water line is connected between stacked unit battery packs.

As shown in FIGS. 1 and 2, a rechargeable battery pack 100 according to the first embodiment of the present disclosure includes a plurality of unit battery packs 10, each of the unit battery packs 10 having an accommodation space 11 into which a plurality of cell modules (e.g., battery cells) are inserted. The unit battery packs 10 are stacked and coupled together in multiple stages (or levels). The rechargeable battery pack 100 further includes a coolant line (e.g., a cooling water line) 30 through which a coolant (e.g., cooling water) circulates inside the unit battery packs 10 and which allows the cooling water to circulate between the unit battery packs 10. For example, a connection part 40 connects the cooling water line 30 in adjacent unit battery packs 10 to each other.

In some embodiments, the rechargeable battery pack 100 has a straight hexagonal shape in which the unit battery packs 10 are stacked and formed, and the accommodation space 11 may be formed therein. A plurality of cell modules may be accommodated in the accommodation space 11 of each of the unit battery packs 10. Each unit battery pack 10 may be closed and sealed by a cover part 13 (or by an adjacent unit battery pack 10 that is stacked and coupled thereto) while accommodating a plurality of cell modules therein. A cooling water input/output part 12 may be formed on a side surface of the unit battery pack 10.

Each cell module may be configured as (e.g., may include) a plurality of unit battery cells, for example, rechargeable battery cells. The unit battery cells included in each cell module may be connected to each other by a bus bar, and the plurality of cell modules may be electrically connected to each other through a bus bar. The unit battery cells may be cylindrical rechargeable batteries that are configured to be repeatedly charged and discharged.

The cooling water line 30 for cooling may be formed inside the unit battery packs 10.

The cooling water line 30 may be formed to circulate cooling water inside the unit battery packs 10 and may be connected to circulate cooling water between the unit battery packs 10.

For example, the cooling water line 30 may be formed between (e.g., may extend between) the unit battery packs 10 stacked in multiple stages to connect the unit battery packs 10 to each other so that the cooling water may be circulated therebetween.

In some embodiments, the cooling water line 30 may include a first cooling line 31 formed in (or extending in) a height direction (e.g., a stacked direction) inside the unit battery pack 10 along which the cooling water moves, a second cooling water line 32 connected to (e.g., in fluid communication with) the first cooling line 31 and formed along an inner bottom portion (e.g., a bottom surface) of the unit battery pack 10, and an inclined line 33 connecting the first cooling line 31 and the second cooling water line 32 to each other.

One end of the first cooling line 31 may be exposed to (e.g., open to) an upper portion (or upper surface) of the unit battery pack 10, and the first cooling line 31 may extend with a long length along an inner side surface of the unit battery pack 10 to (e.g., to be exposed or open to) the lower portion (or lower surface) of the unit battery pack 10.

It will be exemplarily described that the first cooling line 31 is formed as a pair (e.g., two first cooling lines 31 are formed) at both sides in a vertical direction inside the unit battery pack 10. However, the first cooling line 31 is not necessarily limited to being formed as a pair at the inner side of the unit battery pack 10, and in other embodiments, the first cooling line 31 may be formed as three or more (e.g., three or more first cooling lines 31 may be formed) in positions spaced apart from the side surface of the unit battery pack 10. In some embodiments, the second cooling line 32 may extend between (e.g., may connect) one first cooling line 31 to another first cooling line 31 in the unit battery pack 10.

The first cooling line 31 may have a circular cross-section and a long length along the inside of the unit battery pack 10. However, the first cooling line 31 is not necessarily limited to a circular cross-section, and the first cooling line 31 may have, for example, a rectangular cross-section.

The first cooling line 31 may be connected to the second cooling water line 32 inside the unit battery pack 10 such that the cooling water may be circulated through the second cooling water line 32.

The inclined line 33 may be connected to the first cooling line 31 and to the second cooling water line 32 for connecting the first cooling line 31 to the second cooling water line 32.

One end of the inclined line 33 may be connected to (e.g., may open to) the first cooling line 31, and the other end thereof may be connected to (e.g., may open to) the second cooling water line 32 at a bottom position (e.g., in a bottom surface) of the unit battery pack 10.

As such, because the inclined line 33 connects the first cooling line 31 and the second cooling water line 32 to each other while being in an inclined state at with an inclined angle (e.g., a predetermined inclined angle), the cooling water flowing through the first cooling line 31 may smoothly move to the second cooling line 32.

The inclined line 33 may connect the first cooling line 31 and the second cooling water line 32 at an inclined angle in a range from about 30 degrees to about 40 degrees. For example, the inclined line 33 may extend at an angle sufficient for the cooling water to smoothly circulate according to an amount of cooling water and a size of the unit battery pack 10.

One end of the second cooling water line 32 may be connected to the inclined line 33, and the second cooling water line 32 may extend with a long length along the inside of the bottom of the unit battery pack 10.

For example, the second cooling water line 32 has a long length along the inside of the bottom of the accommodation space 11 in which the cell module is accommodated so that overheating may be effectively avoided or mitigated during a driving process of the rechargeable battery pack 100 by properly circulating and supplying the cooling water.

As described above, the cooling water flowing along the first cooling line 31 and the inclined line 33 and the second cooling water line 32 may be supplied to the adjacent unit battery pack 10 stacked in multiple stages through the connection part 40.

Figure 3:
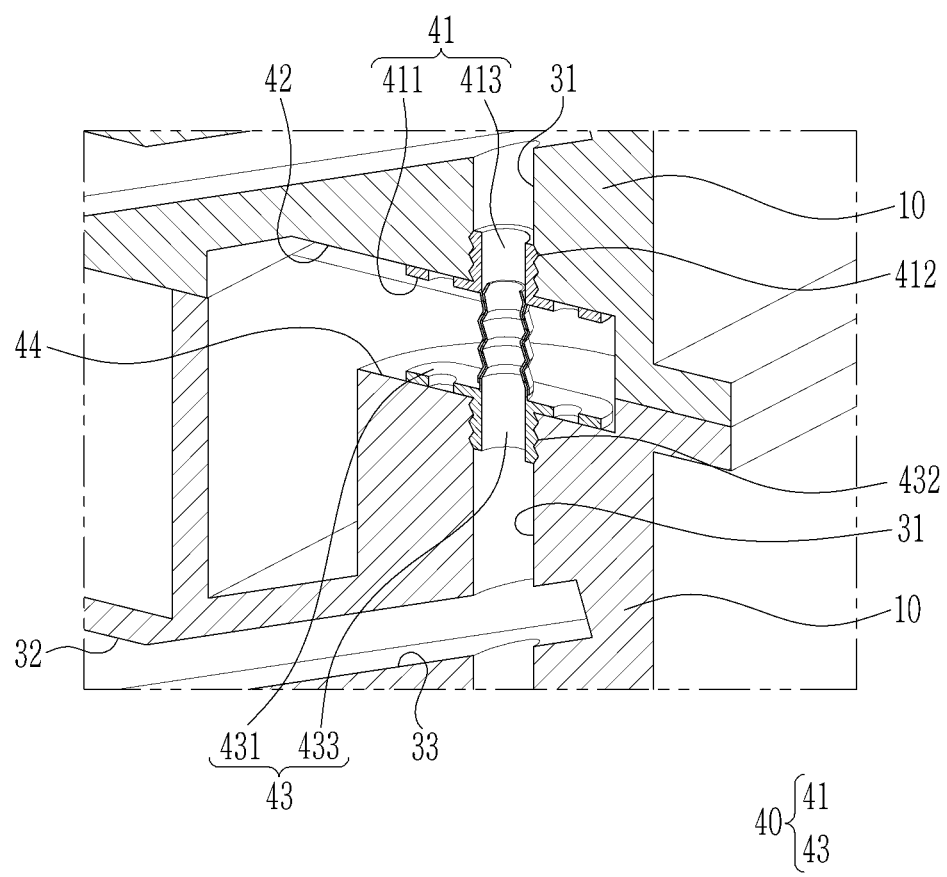
FIG. 3 is a schematic illustration of the area A of FIG. 2 in a state in which a cooling water line is connected between unit battery packs by a connection part.
Figure 4:
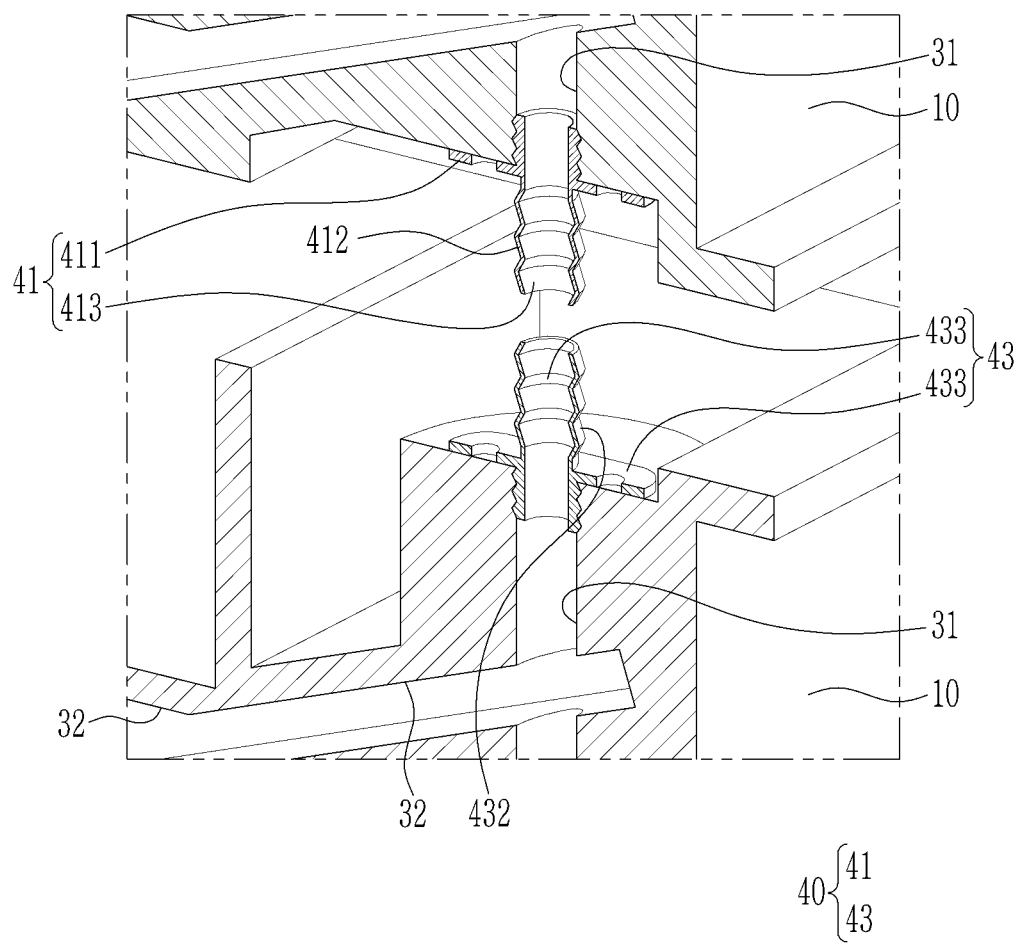
FIG. 4 is a schematic cross-sectional perspective view of the area A of FIG. 2 in a state in which the connection part is disconnected.

FIG. 3 is schematic illustration of the area A of FIG. 2 and shows components in a state in which the cooling water line 30 is connected between unit battery packs 10 by a connection part. FIG. 4 is a schematic cross-section perspective view of the area A of FIG. 2 and shows components in a state in which the connection part shown in FIG. 3 is disconnected, and FIG. 5 is a schematic perspective view of the connection part in a disconnected state.

Figure 5:
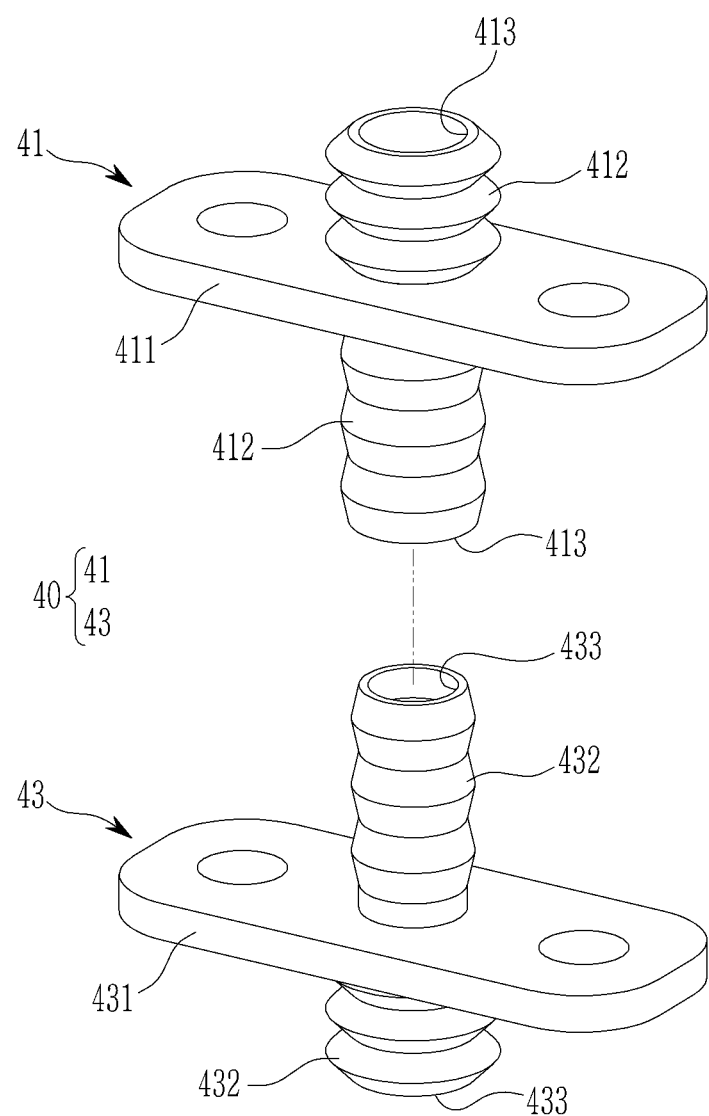
FIG. 5 is a schematic perspective view of a connection part according to a first embodiment of the present disclosure in a disconnected state.

As shown in FIGS. 3 to 5, the connection part 40 may include a first connection part 41 inserted into and connected to the first cooling line 31 at a lower portion of a first one of the unit battery packs 10 and a second connection part 43 inserted into and connected to the first cooling line 31 at an upper portion of a second one of the unit battery packs 10. Further, the second connection part 43 is inserted into and connected to the first connection part 41.

The first connection part 41 may include a first flange part 411 fixed at the position of the first cooling line 31 on a lower surface of the first unit battery pack 10 and a first connection pipe 413 that is fixed to (or integral with) the first flange part 411 and has one side inserted into the first cooling line 31 and another side protruding downwardly from the first flange part 411. In some embodiments, the first flange part 411 may sit in a first groove formed in the first unit battery pack 10.

The first flange part 411 may be fixed by a fastening member while being in surface contact with the lower surface of the first unit battery pack 10 at a position at where the first cooling line 31 is formed.

A first insertion part 42 may be formed to face the lower surface of the first unit battery pack 10 and may be at where the first flange part 411 is fixed.

The first connection pipe 413 may be connected to the first flange part 411 in a state in which the first connection pipe 413 vertically protrudes from the first flange part 411.

One side of the first connection pipe 413 (e.g., one portion of the first connection pipe 413 on one side of the first flange part 411) may be inserted and fixed into the inside of the first cooling line 31 of the first unit battery pack 10, and the other side of the first connection pipe 413 may protrude from a lower surface of the first flange part 411 (e.g., another portion of the first connection pipe 413 on the other side of the first flange part 411).

A first friction protrusion 412 may protrude from an outer surface of the first connection pipe 413. For example, a plurality of first friction protrusions 412 may protrude from the outer surface of the first connection pipe 413 so that a press-fitting action occurs when the first connection pipe 413 is inserted and fixed inside the first cooling line 31, thus providing stable insertion and fixation.

The first connection pipe 413 may be connected to a second connection pipe 433 of the second connection part 43, which is installed on an upper portion of the adjacent (or second) unit battery pack 10.

The second connection part 43 may include a second flange part 431 fixed at an upper portion of the second unit battery pack 10 at a position of the first cooling line 31 and a second connection pipe 433 that is fixed to (or integral with) the second flange part 431. One side of the second connection pipe 433 is inserted into and fixed to the inside of the first connection pipe 413, and another side of the second connection pipe 433 is inserted into the inside of the first cooling line 31 of the second unit battery pack 10.

The second flange part 431 may be fixed by a fastening member while being in surface contact with an upper surface of the second unit battery pack 10 at a position where the first cooling line 31 is formed. In some embodiments, the second flange part 431 may sit in a second groove formed in the second unit battery pack 10.

A second insertion part 44 may be formed to face the upper surface of the unit battery pack 10 and may be at where the second flange part 431 is fixed.

The second insertion part 44 may have the same or similar shape and/or depth as that of the first insertion part 42.

As such, a connection space may be formed between the first insertion part 42 and the second insertion part 44 at where the first connection pipe 413 and the second connection pipe 433 are connected with each other between the unit battery packs 10 in a state in which the first insertion part 42 and the second insertion part 44 are in communication with each other.

One side (e.g., one end) of the second connection pipe 433 may protrude from an upper portion of the second flange part 431 to be inserted and fixed into the inside of the first connection pipe 413 in the connection space. The other side (e.g., the other end) of the second connection pipe 433 may be inserted and fixed into the inside of the first cooling line 31 in the second unit battery pack 10.

A second friction protrusion 432 may protrude on an outer surface of the second connection pipe 433.

A plurality of second friction protrusions 432 protrude on the outer surface of the second connection pipe 433 so that a press-fitting action occurs during a process in which the second connection pipe 433 is inserted and fixed inside the first cooling line 31, thus stable insertion and fixation therebetween may be realized.

In addition, because a press-fitting action may occur during a process in which the second connection pipe 433 is inserted into the inside of the first connection pipe 413, the second friction protrusion 432 provides stable insertion and fixation therebetween.

In the rechargeable battery pack 100 according to the illustrated embodiment, a connection terminal electrically connected to a bus bar may be installed in each of the unit battery packs 10, which are stacked in multiple stages (or multiple levels).

Accordingly, the unit battery packs 10 stacked in multiple stages of the rechargeable battery pack 100 may be electrically connected to each other by the connection terminal.

As described above, because the rechargeable battery pack 100 according to the first embodiment of the present disclosure forms the cooling water line 30 through which the cooling water is circulated inside the unit battery pack 10, it is possible to prevent or substantially prevent the cooling water line 30 from being damaged by external impacts, thereby improving durability of the rechargeable battery pack 100.

In addition, it is possible to improve the circulation efficiency of cooling water by configuring the cooling water line 30 to include the first cooling line 31 extending in the vertical direction and the second cooling water line 32 connected to the first cooling line 31 by the inclined line 33.

Figure 6:
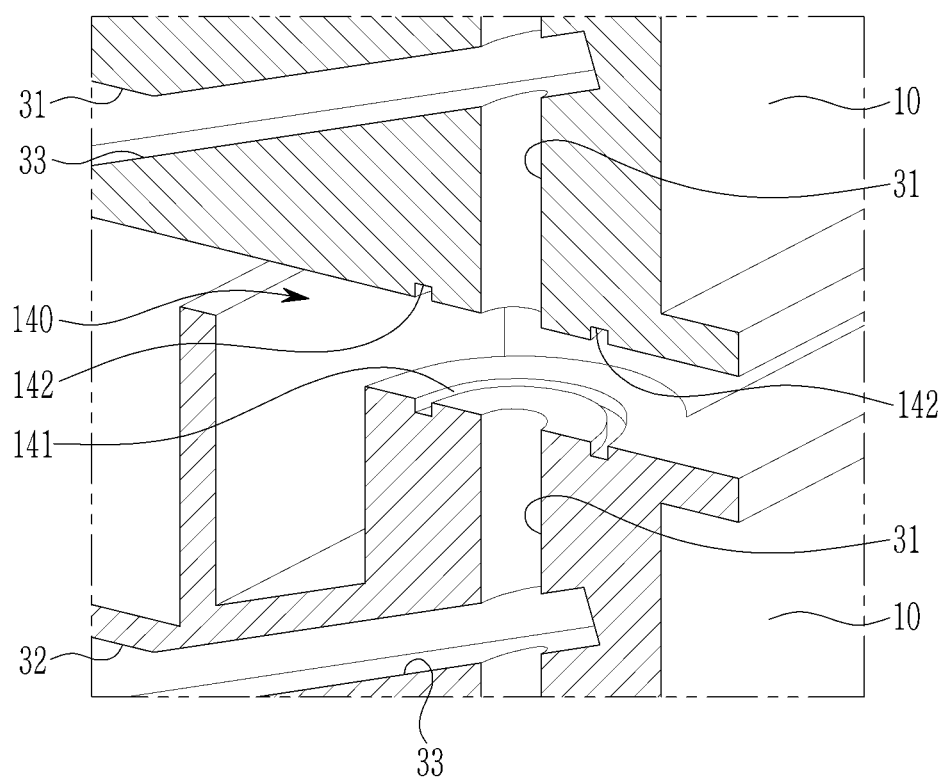
FIG. 6 is a schematic exploded perspective view of a rechargeable battery pack in a state in which a connection part according to a second embodiment of the present disclosure is formed inside the rechargeable battery pack.
Figure 7:
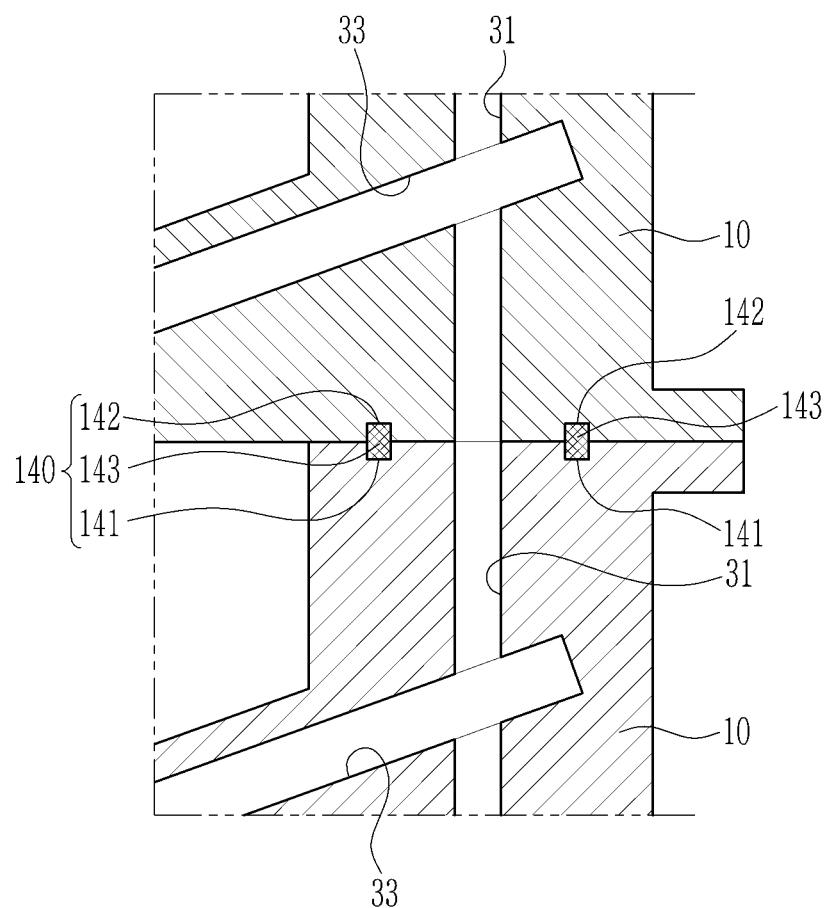
FIG. 7 is a schematic cross-sectional view of a state in which a connection part is formed in a state in which the unit battery packs shown in FIG. 6 are stacked.

FIG. 6 is a schematic exploded perspective view of parts of a rechargeable battery pack which a connection part according to a second embodiment of the present disclosure is formed there inside, and FIG. 7 is a schematic cross-sectional view of the parts shown in FIG. 6 in a stacked (or connected) state. The same reference numerals as those in FIGS. 1 to 5 refer to the same or similar elements having the same or similar functions, and a detailed description of elements indicated by the same reference numerals may be omitted hereinafter.

As shown in FIGS. 6 and 7, a connection part 140 of the rechargeable battery pack according to the second embodiment of the present disclosure includes: a first groove 141 formed on an upper surface of a first unit battery pack 10 and, for example, formed on an upper surface of a portion thereof in which the first cooling line 31 is formed; a second groove 142 formed on a lower surface of a second unit battery pack 10 and, for example, formed on a lower surface of the portion in which the first cooling line 31 is formed; and a binder 143 applied on the insides of (e.g., in) the first and second grooves 141 and 142 in a state in which the first and second grooves 141 and 142 are in communication with each other.

The first groove 141 may have a round shape on the upper surface of the unit battery pack 10 based on (e.g., extending around) a position where the first cooling line 31 is exposed to the outside in the unit battery pack 10.

The first groove 141 may have a round shape around a position at where the first cooling line 31 is exposed and may be recessed into the surface of the unit battery pack 10 in a rectangular cross-section shape.

The second groove 142 may have a round shape on the lower surface of the unit battery pack 10 based on (e.g., extending around) the position at where the first cooling line 31 is exposed to the outside in the unit battery pack 10.

For example, the first groove 141 and the second groove 142 may have the same shape and the same size and may be formed on the upper and lower surfaces of adjacent unit battery packs 10, respectively.

Accordingly, when the unit battery packs 10 are stacked and the upper and lower surfaces of the unit battery packs 10 are in surface contact with each other, the first and second grooves 141 and 142 communicate with each other to form a filling space.

The binder 143 may be applied on (or in) this filling space.

As described above, because the binder 143 is applied on the inside of the filling space formed between the first groove 141 and the second groove 142, sealing and bonding is possible in a state in which the unit battery packs 10 are stacked.

Accordingly, the unit battery packs 10 are stacked to effectively seal the first cooling lines 31 connected to each other, thereby enabling smooth circulation of the cooling water.

The binder 143 may be applied as an adhesive (e.g., a silicon adhesive) that is applied in a gel or liquid state and cured at room temperature.

Figure 8:
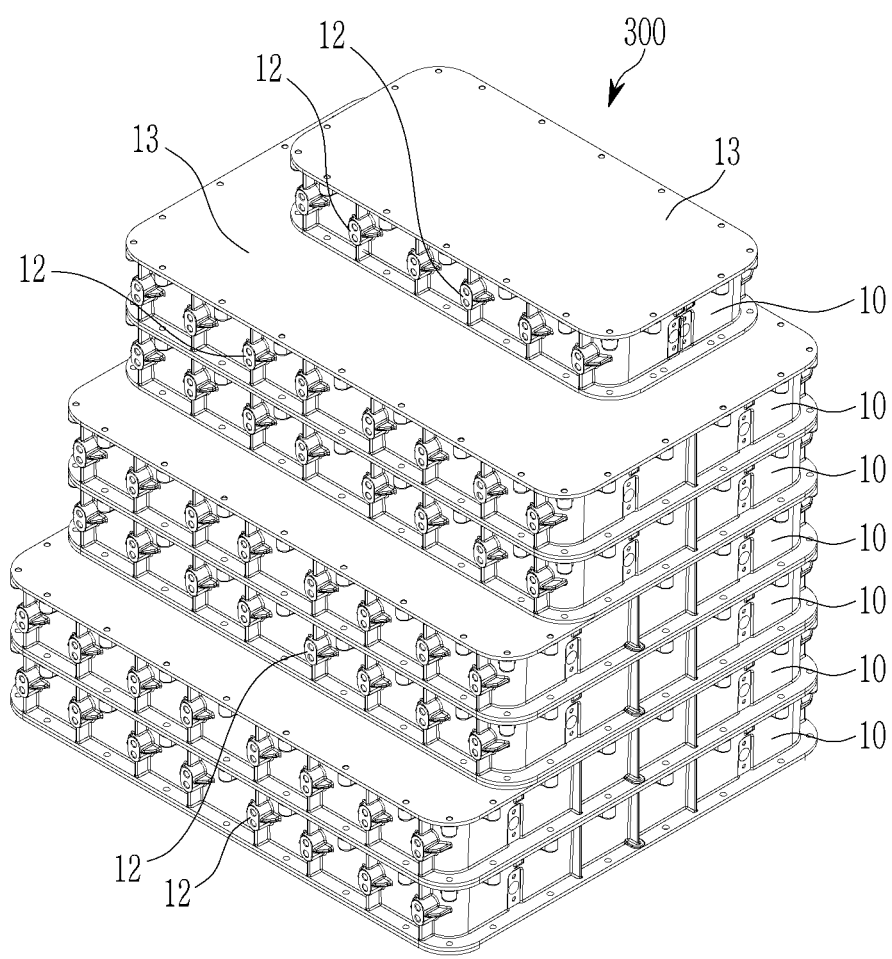
FIG. 8 is a schematic perspective view of a rechargeable battery pack including a plurality of stacked unit battery cells according to a third embodiment of the present disclosure.

FIG. 8 is a schematic perspective view of a rechargeable battery pack according to a third embodiment of the present disclosure. The same reference numerals as those in FIGS. 1 to 7 refer to the same or similar elements having the same or similar functions, and a detailed description of the elements indicated by the same reference numerals may be omitted hereinafter.

As shown in FIG. 8, in a rechargeable battery pack 300 according to the third embodiment of the present disclosure, the unit battery packs 10 may be stacked in different sizes in the vertical direction.

For example, in the rechargeable battery pack 300 of the third embodiment, the unit battery packs 10 may be stacked in multiple stages (or levels), and the unit battery packs 10 in the different stages may have different sizes in the vertical direction such that the accommodation spaces 11 are formed in multiple stages in the vertical direction, and the cell modules may be installed inside each of the accommodation spaces 11.

Here, the accommodation spaces 11 may be formed in a vertical direction of the unit battery packs 10 with different sizes (e.g., the unit battery packs 10 in the different stages may have different sized accommodation spaces 11).

For example, because the rechargeable battery pack 300 of the third embodiment is a multi-stacked type with reduced size in the vertical direction (e.g., a tapered shape in the vertical direction), it is possible to improve a degree of freedom of installation.

In addition, in the rechargeable battery pack 300 of the third embodiment, a connection terminal electrically connected to a bus bar may be installed in each of the unit battery packs 10 stacked in the multiple stages.

Accordingly, the unit battery packs 10 stacked in multiple stages in the rechargeable battery packs 300 may be electrically connected to each other through the connection terminal.

While this disclosure has been described in connection with what is presently considered to be practical example embodiments, it is to be understood that the disclosure is not limited to the disclosed embodiments and is intended to cover various modifications and equivalent arrangements included within the spirit and scope of the appended claims and their equivalents.

Description of Some Reference Numerals

10 ... unit battery pack
11 ... accommodation space
12 ... cooling water input/output part
30 ... cooling water line
31 ... first cooling line
32 ... second cooling line
33 ... inclined line
40, 140 ... connection part
41 ... first connection part
411 ... first flange
412 ... first friction protrusion
413 ... first connection pipe
42 ... first insertion part
43 ... second connection part
431 ... second flange part
433 ... second connection pipe
44 ... second insertion part
141 ... first groove
142 ... second groove
143 ... binder

What is claimed is:

1. A rechargeable battery pack comprising:
a plurality of unit battery packs stacked and coupled to each other in a height direction in multiple stages, the unit battery packs having a cooling water line formed therein to circulate cooling water inside the corresponding unit battery pack, the cooling water line comprising:
a first cooling line extending in the height direction inside the corresponding unit battery pack; and
a second cooling line connected to the first cooling line and extending along an inner bottom surface of the corresponding unit battery pack; and
a connection part connecting the cooling water line in adjacent ones of the unit battery packs to each other such that the cooling water line is configured to circulate cooling water therebetween, the connection part comprising:
a first connection part connected to the first cooling line at a lower portion of a first one of the unit battery packs; and
a second connection part inserted into and connected to the first connection part at an upper portion of a second one of the unit battery packs, and
wherein the first connection part comprises:
a first flange part on a lower surface of the first one of the unit battery packs; and
a first connection pipe coupled to the first flange part, one side of the first connecting pipe being inserted into the first cooling line in the first one of the unit battery packs and another side of the first connecting pipe protruding from the first flange part opposite to the one side of the first connection pipe.

2. The rechargeable battery pack of claim 1, wherein a first groove is in the lower surface of a first one of the unit battery packs at where the first flange part is fixed.

3. The rechargeable battery pack of claim 2, wherein a plurality of first friction protrusions protrude on an outer surface of the first connection pipe.

4. The rechargeable battery pack of claim 3, wherein the second connection part comprises:
a second flange part on an upper surface of the second one of the unit battery packs; and
a second connection pipe coupled to the second flange part, one side of the second connection pipe being inserted into and fixed to the first connection pipe and another side of the second connection pipe being inserted into the first cooling line in the second one of the unit battery packs.

5. The rechargeable battery pack of claim 4, wherein a second groove is in the upper surface of the second one of the unit battery packs where the second flange part is fixed.

6. The rechargeable battery pack of claim 5, wherein a plurality of second friction protrusions protrude on an outer surface of the second connection pipe.

7. The rechargeable battery pack of claim 1, wherein the first cooling line and the second cooling line are connected to each other by an inclined line inside the corresponding unit battery pack.

8. A rechargeable battery pack comprising:
   a plurality of unit battery packs stacked and coupled to each other in a height direction in multiple stages, the unit battery packs having a cooling water line formed therein to circulate cooling water inside the corresponding unit battery pack, the cooling water line comprising:
      a first cooling line extending in the height direction inside the corresponding unit battery pack; and
      a second cooling line connected to the first cooling line and extending along an inner bottom surface of the corresponding unit battery pack; and
   a connection part connecting the cooling water line in adjacent ones of the unit battery packs to each other such that the cooling water line is configured to circulate cooling water therebetween,
   wherein the connection part comprises:
      a first groove on an upper surface of a first one of the unit battery packs around where the first cooling line in the first one of the unit battery packs opens outside the first one of the unit battery packs;
      a second groove on a lower surface of a second one the unit battery packs around where the first cooling line in the second one of the unit battery packs opens outside the second one of the unit battery packs; and
      a binder in the first groove and the second groove to seal the first groove and the second groove to each other.

9. The rechargeable battery pack of claim 8, wherein the first groove and the second groove have the same shape.

10. The rechargeable battery pack of claim 9, wherein the first groove and the second groove have a round shape on a surface of the corresponding unit battery pack around the first cooling line.

11. The rechargeable battery pack of claim 8, wherein the first cooling line and the second cooling line are connected to each other by an inclined line inside the corresponding unit battery pack.

* * * * *